United States Patent [19]

Tiede

[11] Patent Number: 5,613,585
[45] Date of Patent: Mar. 25, 1997

[54] RATCHETING SCREWDRIVER

[75] Inventor: Clair L. Tiede, Mukwonago, Wis.

[73] Assignee: Beere Precision Medical Instruments, Inc., Racine, Wis.

[21] Appl. No.: 433,900

[22] Filed: May 2, 1995

[51] Int. Cl.⁶ .............................. B25B 15/04; F16D 41/16
[52] U.S. Cl. ................................ 192/43.1; 81/62
[58] Field of Search .................. 192/43.1, 43.2; 81/62, 63.1

[56] References Cited

U.S. PATENT DOCUMENTS

| | | |
|---|---|---|
| 791,895 | 6/1905 | Furbish . |
| 878,657 | 2/1908 | Munch . |
| 1,388,836 | 8/1921 | Ripsch et al. . |
| 1,388,923 | 8/1921 | Bullard . |
| 1,440,272 | 12/1922 | Bratton ........................... 81/62 |
| 2,193,984 | 4/1937 | Rhinevault ..................... 192/43.2 |
| 2,201,827 | 5/1940 | Froeschl et al. ............... 192/43.2 |
| 2,627,330 | 7/1948 | Gantz ............................ 192/43.1 |
| 2,744,432 | 5/1956 | Reub ........................... 192/43.1 X |
| 3,340,914 | 9/1967 | Ricks . |
| 3,356,117 | 12/1967 | Wagner . |
| 3,438,413 | 4/1969 | Boran . |
| 3,625,324 | 12/1971 | Scharf ............................. 192/45 |
| 3,742,787 | 7/1973 | Whiteford . |
| 4,466,523 | 8/1984 | DeCarolis et al. . |
| 4,777,852 | 10/1988 | Herman et al. . |
| 5,267,487 | 12/1993 | Falco et al. .................... 74/558 |
| 5,343,776 | 9/1994 | Falco et al. .................... 74/558 |
| 5,437,212 | 8/1995 | Thompson et al. ............. 81/63.1 |

FOREIGN PATENT DOCUMENTS

| | | | |
|---|---|---|---|
| 775487 | 12/1934 | France | 192/43.1 |
| 584232 | 1/1947 | United Kingdom | 81/62 |

*Primary Examiner*—Rodney H. Bonck
*Attorney, Agent, or Firm*—Arthur J. Hansmann

[57] ABSTRACT

A ratcheting mechanism utilizing a driven central gear and two pawls which are movable into and out of driving relation with the gear. An actuating mechanism moves the pawls out of driving relationship, and a resilient member is employed for urging the pawls into contact with the gear. An elastomer covered handle is connected with the mechanism for optimum gripping.

1 Claim, 5 Drawing Sheets

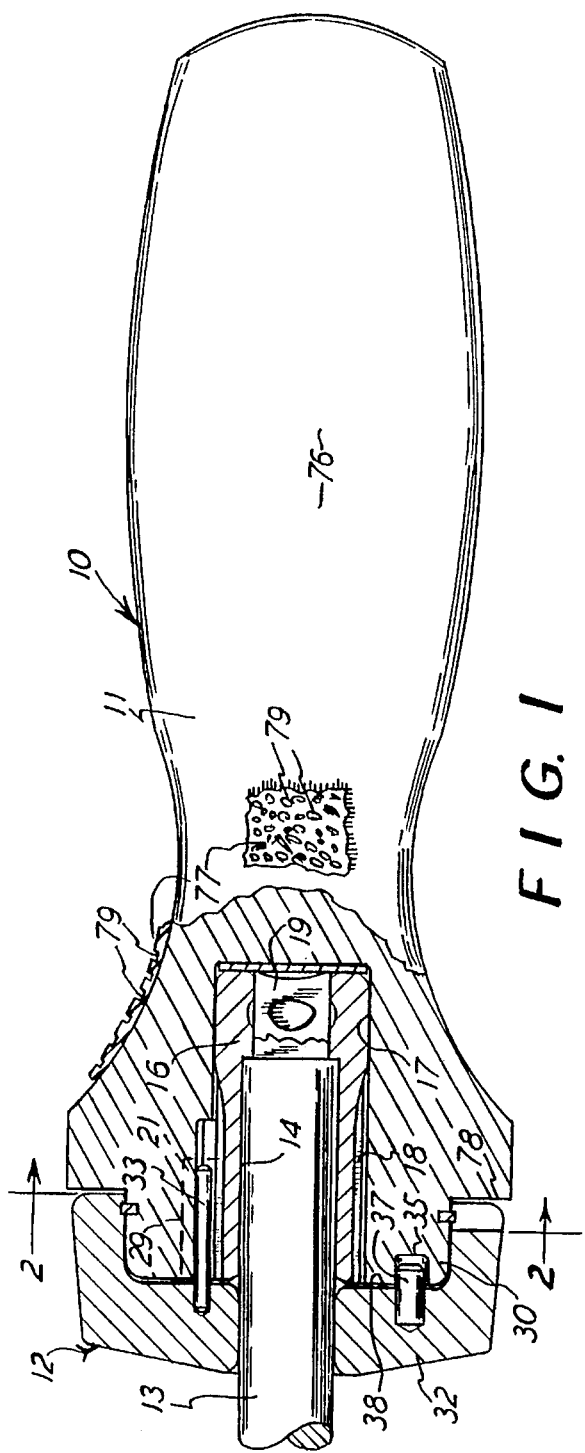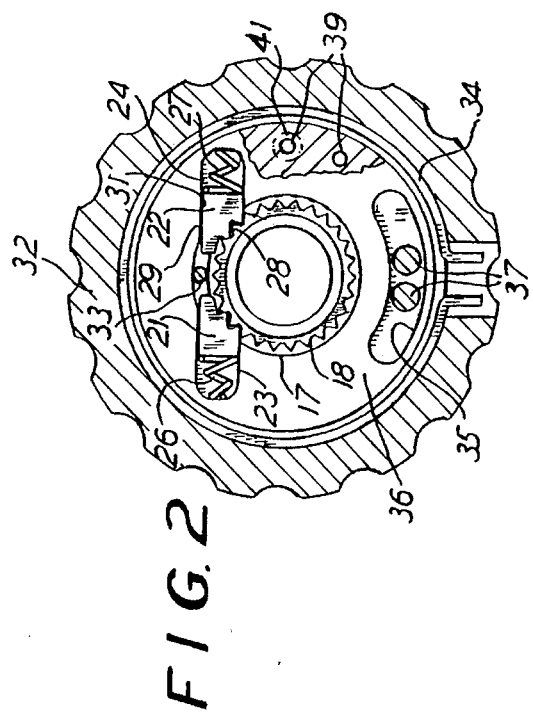

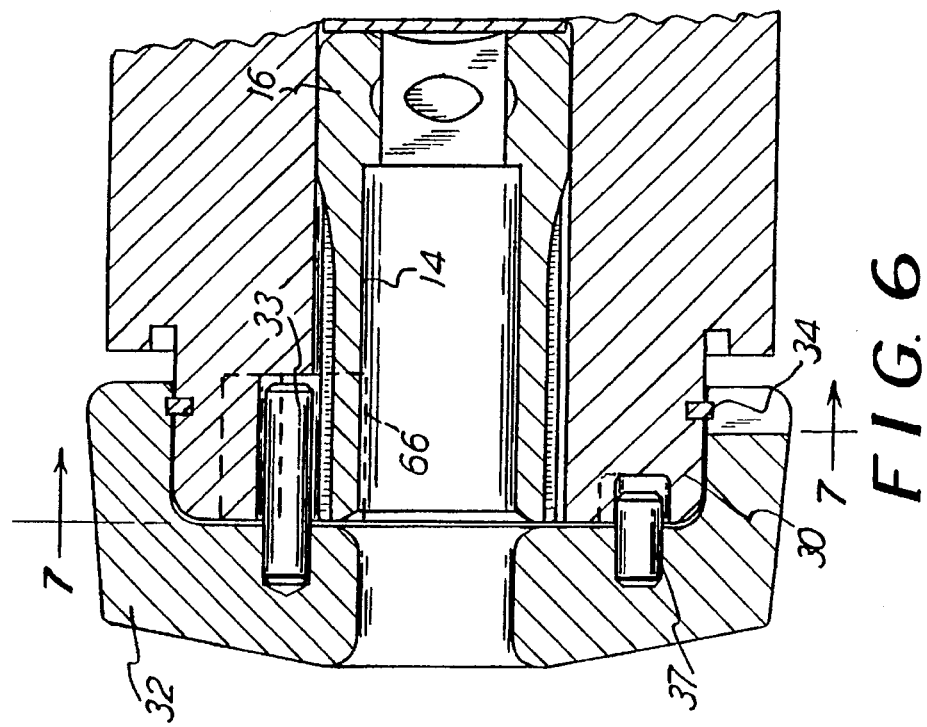
FIG. 6
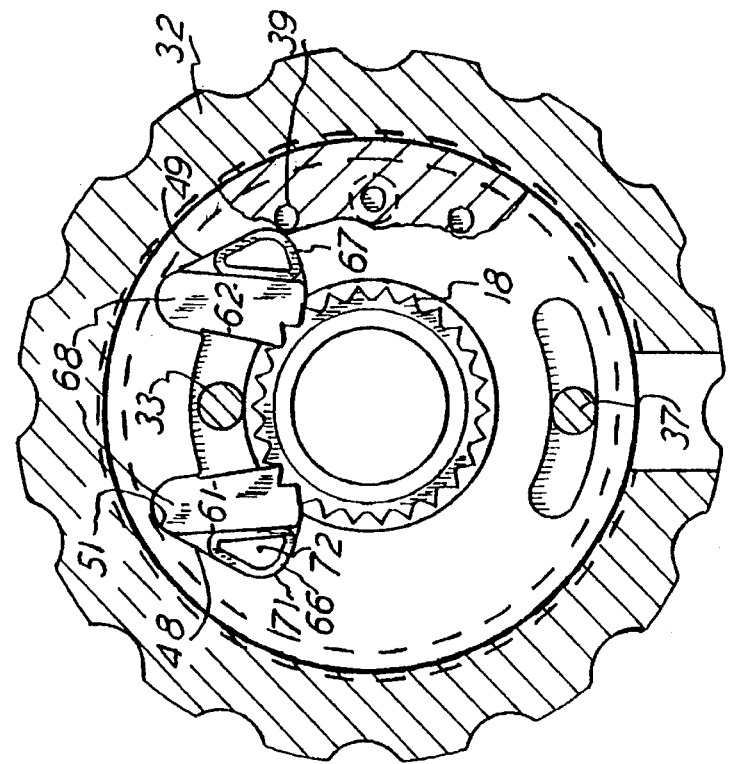
FIG. 9
FIG. 7

5,613,585

RATCHETING SCREWDRIVER

This invention relates to a ratcheting screwdriver, and, more particularly, it relates to a ratcheting screwdriver which can be set in two different ratcheting positions and thirdly can be set in a non-ratcheting position.

BACKGROUND OF THE INVENTION

Ratcheting screwdrivers are already known in the prior art. These ratcheting screwdrivers or mechanisms are known and utilized for the performance of ratcheting in either direction or not ratcheting at all. In that prior art, and in context of the present invention, the ratcheting mechanism utilizes a gear which carries the screwdriver or tool bit, and also utilizes two pawls which are moved into and out of driving relationship with the gear.

Examples of ratcheting mechanisms which utilize two pawls which are fully movable toward and away from the driven gear are seen in U.S. Pat. Nos. 878,657 and 1,388,836 and 1,388,923 and 2,193,984. As mentioned, in those examples, the pawls are totally moved toward and away from the gear, and conventional type compression springs are positioned behind the pawls for urging them into toothed relationship with the gear. Also, an actuating mechanism, such as an intervening pin, is disposed between the pawls for moving the pawls against the backup springs and away from the gear for the selectivity of the ratcheting mode desired.

Also, the prior art is aware of ratchet mechanisms which utilize pawls that generally employ a pivotal action in moving the pawl teeth into and out of engagement with the gear teeth. Examples of that are seen in U.S. Pat. Nos. 791,895 and 3,356,117 and 3,742,787 and 4,466,523.

In multiple embodiments in the present invention, the concept of the total displacement and the pivotal action of the pawls is employed. However, in the present invention, the ratcheting mechanism is structurally simplified and is more reliable and sturdy. Also, U.S. Pat. No. 4,777,852 shows a ratcheting screwdriver which employs at least one part in addition to the total number of parts employed in the present invention, and thus the present invention is an improvement and is simplified and more reliable.

Also, the present invention improves upon the prior art in that it is easier to construct and assemble, and it is less expensive. Further, once the present invention's construction is positioned in an operating mode mentioned, it is more reliable in remaining in that mode and less likely that it can be operated or accidentally moved out of the desired mode, as well as being intentionally but undesirably moved from the desired mode. In the present invention, the direct and simple and easy finger maneuvering of one part of the mechanism will directly impart its motion onto the pawls for positioning the pawls in any one of the three desired modes mentioned. That is, there is no multiplicity of actuating parts, and the pawls are moved directly and are retained in the selected position until the operator desires to reestablish the mode by moving the pawls to a different position. Also, the movement of the actuator in the present invention is accomplished in one direction which is the same direction in which the ratcheting action is achieved, rather than a reverse direction which tends to obscure the operation or confuse the user.

Also, in the present invention, the pawls are definitely and firmly positioned in either position of engagement or disengagement relative to the driven gear which carries the work tool, such as a screwdriver bit. This again is achieved by the requirement for only a minimum number of parts which are reliable and adequately positionable and are retained in their position without being susceptible to dislodging or repositioning to where they are not desired.

With ratcheting, it is important that one's hand remain in secure gripping of the tool's handle. A high friction and elastomer handle cover provides the optimum grip, and yet is capable of being repeatedly autoclavable for sterilization, without physical deterioration. Such is the silicone rubber cover. The handle material and surface differ from that in U.S. Pat. Nos. 3,340,914 and 3,438,413.

BRIEF DESCRIPTION OF THE DRAWINGS

FIG. 1 is a side elevational view, partly in section, of a ratcheting mechanism of this invention.

FIG. 2 is a sectional view taken along the broken line 2—2 of FIG. 1.

FIG. 6 is a fragmentary view, but similar to FIG. 1, of another embodiment of this invention.

FIG. 7 is a section view taken along the irregular line 7—7 of FIG. 6, and showing both pawls engaged.

FIG. 9 is an end axial view of one piece shown in FIG. 7.

DETAILED DESCRIPTION OF THE PREFERRED EMBODIMENTS

Figure 3:
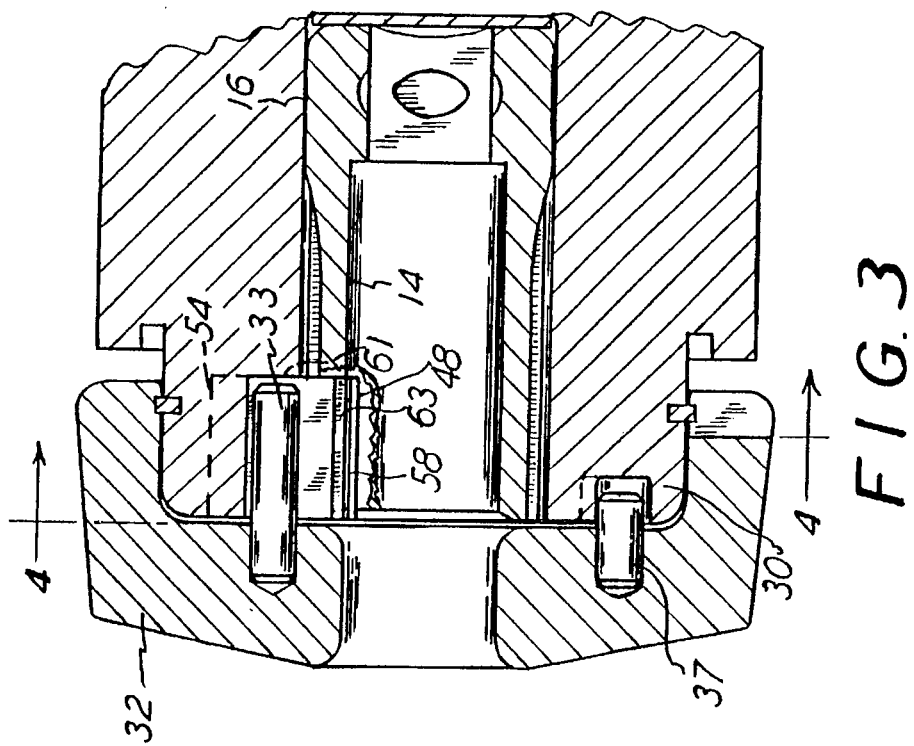
FIG. 3 is a fragmentary view, but similar to FIG. 1, of a different embodiment of this invention.

FIGS. 1 and 2 show one embodiment of the invention, and here it is seen that a screwdriver, generally designated 10 includes an elongated handle 11 and a cap 12. A fragment of a screwdriver bit 13 is shown disposed within the handle 11 in a rectilinear cavity 14 therein. The cavity 14 is presented by a rotatable gear piece 16 which is rotatably disposed in a cylindrical opening 17 in the handle 11. Gear piece 16 has teeth 18 disposed therearound, as shown in FIGS. 1 and 2. The rectilinear drive relationship between the screwdriver bit 13 and the piece 16 is shown at 19. The arrangement is such that any rotation of the gear piece 16 will induce identical rotation of the screwdriver bit 13.

To induce rotational drive from the handle 11 to the screwdriver bit 13, there are two pawls 21 and 22 disposed within the handle 11 in two cavities 23 and 24 therein, as seen in FIG. 2. The pawls 21 and 22 are thus snugly disposed within the pockets or cavities 23 and 24, respectively, and they slide in those two pockets and toward and away from the gear teeth 18. Two compression springs 26 and 27 urge the respective pawls 21 and 22 toward the gear piece 18, such as to the positions shown in FIG. 2. In the positions shown in FIG. 2 with the two pawls 21 and 22 engaged with the gear teeth 18, the handle 11 can be rotated in both directions of clockwise and counterclockwise rotation and the screwdriver bit 13 will be rotated accordingly. That is, there is no ratcheting action in that mode.

If and when the pawl 21 is moved to the left, as viewed in FIG. 2, and against compression spring 26 and clear of the gear teeth 18, then only the pawl 22 would be engaged with the gear teeth 18. In that mode, when the handle 11 is rotated clockwise, as would be viewed from the right-hand end of FIG. 1, then the bit 13 would be clockwise drive relationship with the handle 11 in the stated clockwise direction. That is, the pawl has gear teeth 28, and it has an upper surface 29 which is in sliding contact with the upper wall 31 of the pocket 24. Thus, the stated clockwise rotation of the handle 11 causes the wall 31 to bear downwardly on the pawl upper surface 29 and press the pawl's teeth 28 against the gear teeth 18 and thus produce desired clockwise rotation to the screwdriver bit 13.

In the third mode of operation, the pawl 22 would be moved rearwardly in its pocket 24 and out of contact with the teeth 18 and leave only the pawl 21 in contact with the teeth 18 and have the pawl 21 present its teeth against the gear teeth 18 and thus create a Counterclockwise drive from the handle 11 to the screwdriver bit 13.

For positioning and controlling the pawls, as mentioned above, there is a control member which consists of a circular or ring-type cap 32 and a pin 33 affixed to the cap 32 and extending into the handle 11. The cap 32 is rotatable on the handle circular end 30, in a telescopic fashion, and the cap 32 is secured to the handle 11 by means of a removable snap ring 34 which nests in the usual respective snap ring groove in both the handle 11 and the cap 32, which is also 12.

To limit the amount of rotation of the cap 32 on the housing boss 30, there is an arcuate slot 35 in the face 36 of the handle boss 30, and two pins 37, affixed to the cap 32, extend into the slot 35. Accordingly, rotation of the cap 32 in either direction from that shown in FIG. 2 will cause the pins 37 to reach the respective ends of the slot 35 and thus stop and thereby limit the rotation of the cap 32 on the handle 11. In FIGS. 3–8, there is only one pin 37.

Further, to detect and establish the three positions for the three modes described, the cap 32, on its inner faced wall 38, has three dimples or openings 39, as indicated in FIG. 2. Those dimples 39 separately align with a ball or plunger member 41 set in the end wall 36 of the handle 11. That is, upon rotation of the cap 32, a spring-urged ball or plunger 41 in the handle 11 will be received in the appropriately aligned and rotated opening 39 in the cap 32. As such, each of the three modes is established by the type of snap ball and opening described, and each position will be retained until a sufficient force is applied to rotating the ring 32 to establish another setting or mode, in a somewhat conventional manner as shown in the prior art mentioned herein, and as shown in the graphic fragment.

When the ring 32 is rotated, the affixed pin 33 also rotates, and, as seen in FIG. 2, it is in line with the pawls 21 and 22. Thus, as viewed in FIG. 2, if the ring 32 were rotated counterclockwise, as viewed in FIG. 2, the pin 33 would move against the pawl 21 to thereby disengage the pawl 21 from the gear teeth 18 and establish the first ratcheting mode mentioned above.

In the aforementioned arrangement, the control cap 32 with its pin 33 moves directly into operative contact with the respective pawls 21 and 22, and there is no need for any elaborate or expensive or complicated mechanism to achieve the three modes described. Also, rotation of the ring 32 in one direction, for instance clockwise, will cause the mechanism to ratchet in that clockwise direction and therefore the operator knows the direction of ratcheting simply upon experiencing the direction of rotation of the control or ring 32, as mentioned.

Figure 4:
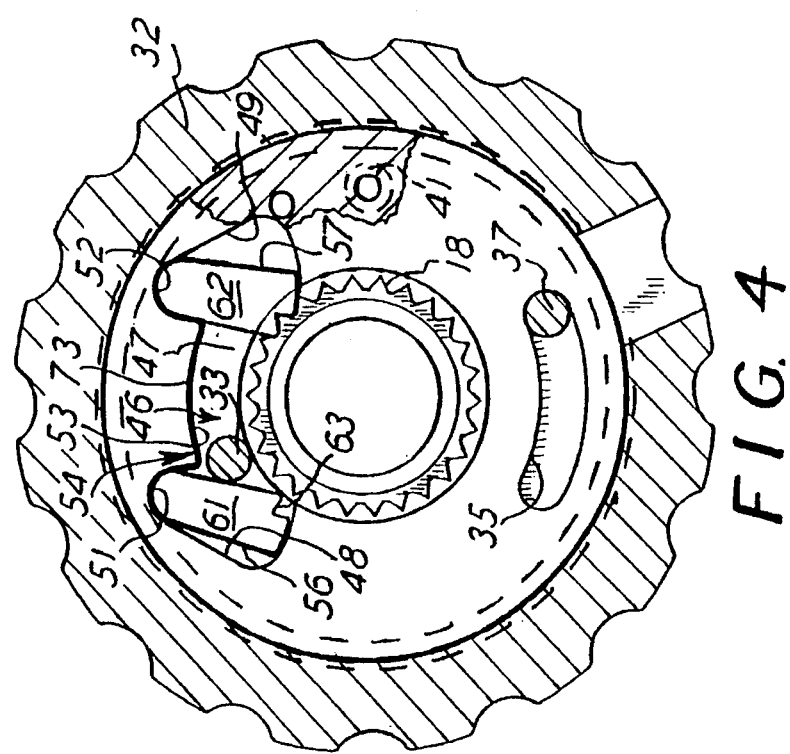
FIG. 4 is a section view taken along the irregular line 4—4 of FIG. 3, and showing only one pawl engaged.
Figure 5:
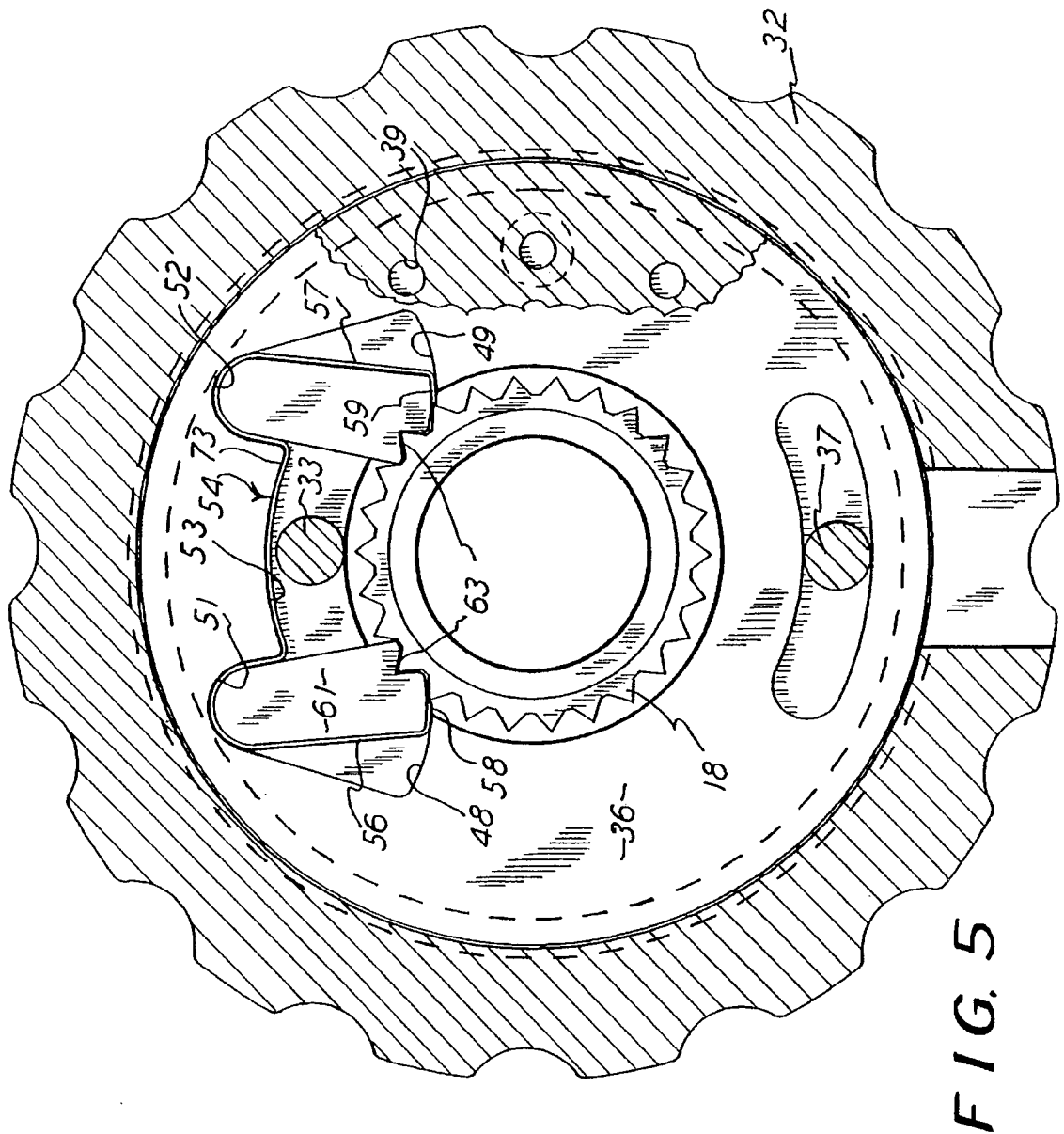
FIG. 5 is an enlarged view of FIG. 4, but showing both pawls engaged.

Another embodiment shown in FIGS. 3, 4, and 5 is somewhat similar to the first embodiment except for the arrangement of the two pawls and the resilient means for urging the pawls into engagement with the gear 18. Thus, FIGS. 3, 4, and 5 show the handle boss 30 is provided with an open-end cavity 46 which has a central arcuate portion 47 and two flanking portions 48 and 49 which are substantially tangentially disposed relative to the gear 18. The cavity configurations 48 and 49 both have substantially semicircular walls 51 and 52, respectively, and those semicircular walls 51 and 52, along with the intervening arcuate wall 53, have a one-piece spring 54 in contact therewith, as shown in FIGS. 4 and 5. Thus, the spring 54 has the configuration of the heretofore described cavity walls, and it also has the two spaced-apart legs 56 and 57 which terminate in feet or hooks 58 and 59. FIG. 3 shows the extent of the cavities and the one-piece spring 54 along the longitudinal axis of the screwdriver.

Two pawls 61 and 62 are pivotally disposed in the cavity 46, and particularly are disposed and configured to be in contact with the spring 54 and to actually conform to the semicircular portions described and also to the legs and feet of the spring, as described and as shown. The pawls 61 and 62 have teeth 63 and extend to and engage the teeth 18 of the gear, such as shown with the pawl 62 in FIG. 4.

FIG. 4 shows that the control pin 33 has been moved into contact with the pawl 61 to move the pawl 61 out of toothed engagement with the gear 18. That is the same mode as described in connection with FIG. 2, and thus the same driving and ratcheting action prevail. That is, the control ring 32 has been rotated clockwise to have the pin 33 urge the pawl 61 out of toothed engagement with the gear 18. Of course the pawls 61 and 62 are urged inwardly toward the gear 18, such as in the position shown with the pawl 62 in FIG. 4, when the pin 33 is not active. That is, FIG. 5 shows an enlarged view of the arrangement with both pawls 61 and 62 in contact with the gear teeth 18, and thus there is no ratcheting and the screwdriver is operative for driving in both clockwise and counterclockwise directions.

The arrangement in FIGS. 3, 4, and 5 permits the assembly of the mechanism with the two pawls 61 and 62 and the spring 54 to be all in one three-piece assembly so that it can be inserted into the handle cavity heretofore described and thus simplify the assembly and the accuracy thereof. Also, when one spring leg, such as leg 56, is urged away as shown, then there is more spring tension applied through the opposite spring leg, such as leg 57 and thereby assure that the pawl 62 will remain in contact with the gear 18, as desired.

Another embodiment as shown in FIGS. 6, 7, and 8, and again here the arrangement is generally the same as the aforementioned except for the manner of resiliently or yieldingly urging the pawls 61 and 62 into engagement with the gear teeth 18. In the display in FIGS. 7 and 8, the pawls 61 and 62 can again be utilized, but the spring 54 from the previous embodiment would be omitted. Instead, the pawls 61 and 62 are resiliently urged toward the teeth 18 by means of resilient members 66 and 67 which, in this showing, are displayed as cylindrical tubes which in their free-body form are completely tubular or circular, and in FIGS. 7 and 8 they are shown compressed and out of the circular or completely tubular original configuration and free-body arrangement. That is, FIG. 7 shows the tubes 66 and 67 slightly compressed and disposed within the pockets 48 and 49 and behind the pawls 61 and 62, respectively. The resilient members 66 and 67 therefore substitute for the spring 54 and are made of a silicone rubber material which is of long-lasting characteristics, completely durable, and also susceptible to sterilization through heat and pressure without noticeable deterioration. That is, the tubes 66 and 67 are sturdy and durable both for the mechanical function as well as for the sterilization function to which this screwdriver may be subjected if and when it is used as a surgical implement. FIG. 9 shows the free-body position of the tubes 66 and 67 which are circular, as mentioned, prior to being in the assembled position shown in FIGS. 7 and 8. The sleeves 66 and 67 extend for the depth or length of the pockets 48 and 49, such as indicated in FIG. 6. As such, the resilient members 66 and 67 amply urge the respective pawls 61 and 62 into toothed engagement with the gear 18 at any time that the pin 33 is not positioned against the pawl 61 or 62, such as shown with regard to the pawl 61 in FIG. 8. In that position, it will be noted that the tube 66 is collapsed in its whole resilient urging position, and is ready to reposition the pawl 61 into engagement with the teeth 18 when the pin 23 is moved out of contact with the pawl 61, such as to the position shown in FIG. 7.

Figure 8:
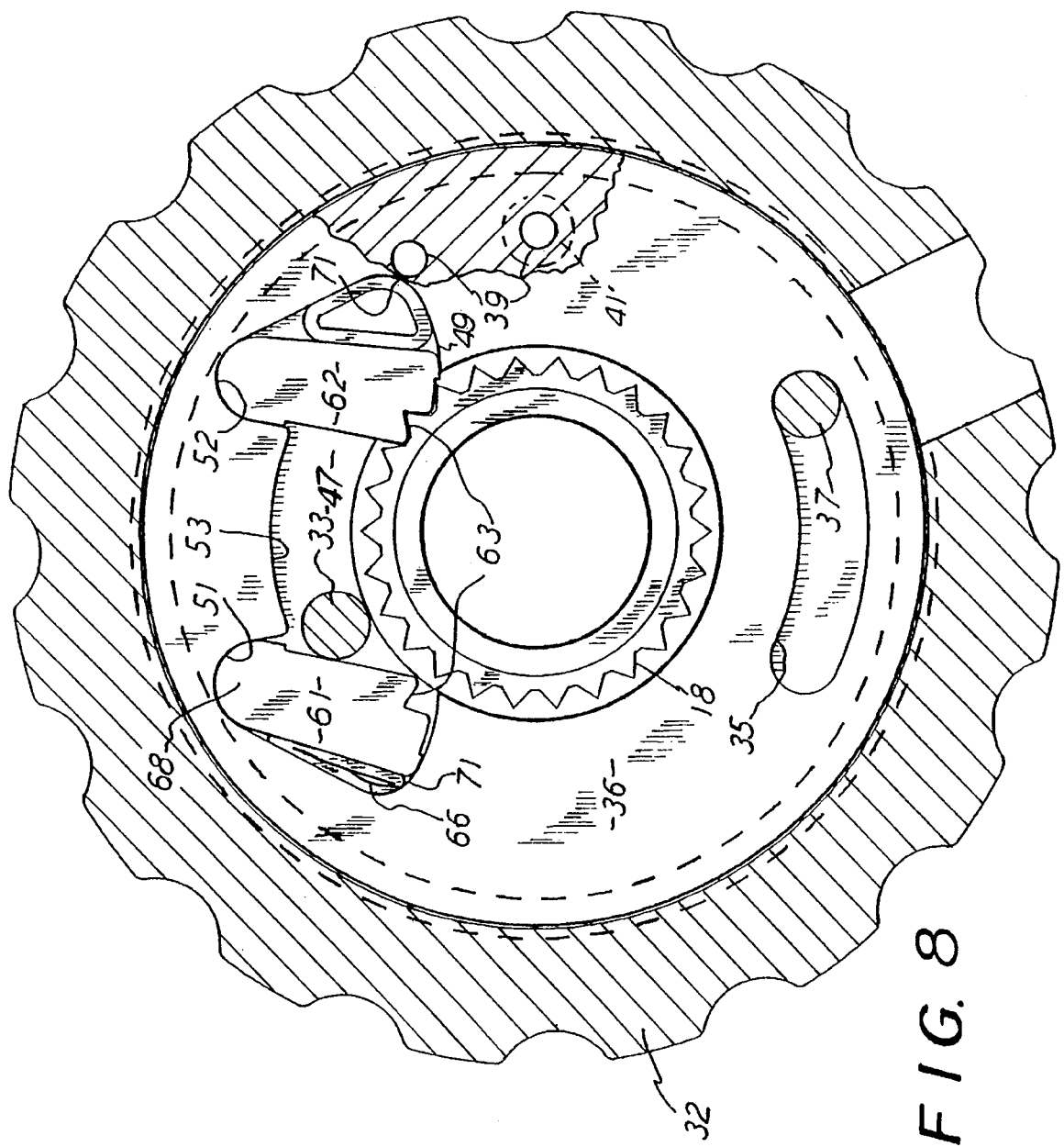
FIG. 8 is an enlarged view of FIG. 7, but showing only one pawl engaged.

Actually, pawls 61 and 62, the third embodiment in FIGS. 7 and 8, are slightly larger in their semi-circular portions which are snug in arcuate pockets 51 and 52 in the handle 11. The pawls 61 and 62 are still pivotal in the cavities 48 and 49. Thus, the pawls in the embodiment are slightly enlarged, and except for the absence of the spring 54, there is the presence of the two resilient members 66 and 67 which are backing the pawls 61 and 62, as shown. Thus, with the members 66 and 67 being silicone rubber, they are sufficiently resilient to urge the pawls 61 and 62 into the positions shown in FIG. 7 and to also yield to permit the pawls to go to the un-toothed engaged position, such as shown with pawl 61 in FIG. 8, the resilient member 66 is collapsed, as shown. Otherwise, the members 66 and 67 are tubular, as shown in FIG. 9, and they extend for the length of the pockets 48 and 49, as indicated in FIG. 6. To be of silicone rubber, the composition is with one component A containing a proprietary platinum catalyst in a network of short and relatively long chains of polydimethylsiloxane and vinylmethylpolysiloxane in a reinforcing silica filler network. The components A and B are mixed in equal proportions on a two-roll mill. Vulcanization occurs as a result of hydrosilylation between the vinyl groups of the polymer, and the SiH functional crosslinking agent. The reaction is catalyzed by the platinum agent present in component A. This is the silicone rubber definition in this specification and it is the ElastoSil product registered trademark of Wacker Silicones Corporation in Adrian, Mich.

In this arrangement, the pockets 48 and 49 are arcuately configured at 71 to conform partly to the cylindrical configuration of the resilient tubes such as shown in FIGS. 7 and 8. Accordingly, the resilient members 66 and 67 are tubular and with the hollow interiors to be capable of collapsing, such as shown with the member 66 in FIG. 8 and also as shown in the inoperative or initial positioning of the members 66 and 67 in FIG. 7 where they are distorted from their true cylindrical configuration and are therefore pre-stressed or initially compressed even though they are with hollow center 72. That is, the outside diameter of the members 66 and 67, in their free-body positions of FIG. 9, are greater than the distance from the tip of the pawls to the adjacent facing wall of the cavities 48 and 49. The cavities 48 and 49 are simply smaller than the span of the members 66 and 67 at the tips of the pawls 61 and 62 and in their arcuate pivotal direction and with regard to the wall of the pockets 48 and 49, as seen in FIG. 7.

The pawls in the last two embodiments serve as struts, in compression, relative to the force applied from the handle 11 and downwardly, as viewed in these drawings, onto the gear 18, The application of the downward force is a rotational force because it is substantially tangential to the gear 18.

In the second embodiment, the spring 54 is substantially M-shaped in that it has its spaced-apart two legs 56 and 57 and its offset intervening portion 73 which is shown to be slightly arcuate and nesting in a corresponding arcuate wall defining the cavity in the handle 11, as shown.

The handle 11 includes a solid core 76, as shown in FIG. 1, and there is a resilient cover 77 molded onto the core 76 and extending over all of the core 76 except the left face thereof defined by the end shoulder 78. The cover 77 is also of the silicone rubber material, and is irregular in its surface, that is, it is dimpled as shown only in the fragments thereof seen in FIG. 1. The cover is of a resilient, elastomeric material, like that mentioned, and it has the dimples or indentations 79 and it therefore enhances the hand grip on the screwdriver for the ratcheting action of turning in both directions without releasing the grip, but while retaining frictional contact on the cover 77 which is also capable of withstanding sterilization, such as for a medical procedure screwdriver, in an autoclaving process of applying heat and pressure to the screwdriver. The silicone rubber cover 77 will not deteriorate in the sterilizing process.

Thus, in the ratcheting action described herein, the user does not release the hand grip on the handle 11. In that regard, the resilient and dimpled, or cockled, cover 77 assists the user in retaining a non-slip grip so that full back-and-forth turning action can be achieved without any hand-to-handle lost motion. Therefore, the cover 77 encapsulates the entire core 76, except for the portion thereof leftward of the shoulder 78, and FIG. 1 simply does not show all of the cover 77 on the core 76, but instead only shows the profile of the sectioned portions to the left of the fragmentation line. The amount of dimpling or indentation at 79 as approximately one-half or forty per-cent of the entire cover 77. It is a random pattern, and is shown as such.

The members 66 and 67 are thus of a resilient material, and that is of a non-metalic material but sufficiently resililent to yieldingly hold the pawls in engaged position.

The ball which is included as 41, ann the openings 39 and the pin 37 and slot 35 are all conventional, such as disclosed in U. S. Pat. No. 4,777,852 where those are shown as old. Also, all of the pawls extend tangentially to the gear 18, and they are disengaged through direct contact by the control pin 33 and without any requirement for any additional part. Thus the control mechanism consisting of the ring 32 and the pin 33 constitute the complete control and it is moved as a complete one-piece unit and is secured in its selected set position by the ball-and-socket of 39 and 41, per prior art and incorporation by reference, if needed.

In the embodiments with pawls 61 62, the pawls are of a size to be snug between the pockets 51 and 52 to the engaged positions with the gear 18., as shown in FIGS. 5 and 7. Next, when the pawls 61 and 62 be moved away from the gear 18, as shown in FIGS. 4 and 8 with pawl 61,the pawls are held in a secure disengaged position by means of the control pin 33 and either the spring 54 or the resilient members 66 and 67, in the alternate. Thus the pawls 61 and 62 cannot move into engaged position with the gear 18 until the pin 33 is moved out of contact with the pawls. The feet 58 and 59 of the spring 54 hold the pawls toward the pockets 51 and 52 at all times, as desired. Also, the member 66 is shown holding the pawl 61 in the pocket 51 and thus away from the gear 18. Further, the bottom of the pockets 48 and 49, as viewed in FIG. 5, are shown in contact with or adjacent to the toothed ends of the pawls and thus assure that the pawls will not go out of the pockets 51 and 52.

In all embodiments, the pawls are always tangential to the gear 18, as shown. Thus optimum torque is transmitted from the handle 11 to the tool bit 13. Also, the spring 54 is a leaf-type spring which exerts its compressive force inwardly toward the pawls. As shown, the spring 54 has the shape of the cavity 47, including the pockets 48 and 49.

What is claimed is:

1. A ratcheting screwdriver, comprising a handle having a cavity with a cavity-defining wall which has two arcuately shaped pockets defined by two arcuate surfaces and which has two end walls respectively spaced from and facing said two arcuate surfaces, a gear rotatably disposed in said handle adjacent said cavity, two pivotal pawls with each having an arcuate portion with an arcuate surface respectively disposed in each of said pockets in respective pivotal support with said two pocket arcuate surfaces and having teeth adjacent said gear and being pivotal into and out of tooth engagement with said gear and with said pawl teeth being on an end of said pawl distant from said arcuate portion thereof, said pawls normally being in engagement with said gear, said respective distant ends of said pawls being in pivotally sliding confined relationship relative to said two end walls, a control movable on said handle and having a portion spaced from said pawls and arranged for engagement with said pawls for moving said pawls out of tooth engagement with said gear for drive disengagement, and resilient means disposed in the path of pivot of said pawls for urging said pawls toward said gear.

* * * * *